United States Patent

Reimers

[15] 3,683,247

[45] Aug. 8, 1972

[54] ELECTRICAL GEAR SHIFTING IN WHEEL DRIVES

[72] Inventor: Eberhart Reimers, 7700 Random Run Lane # 201, Falls Church, Va. 22042

[22] Filed: May 27, 1971

[21] Appl. No.: 147,562

[52] U.S. Cl. ............................318/45, 318/8, 318/46
[51] Int. Cl. ..............................................H02p 3/74
[58] Field of Search..........318/45, 98, 99, 100, 83, 8, 318/46, 13

[56] References Cited

UNITED STATES PATENTS

| | | | |
|---|---|---|---|
| 3,030,564 | 4/1962 | Early et al. ....................318/45 |
| 3,590,349 | 6/1971 | Safiuddin......................318/98 |
| 2,578,015 | 12/1951 | Reinhar.........................318/8 |
| 2,763,823 | 9/1956 | Symes............................318/8 |
| 3,161,083 | 12/1964 | Roe .............................318/8 X |
| 2,726,360 | 12/1955 | Storsand......................318/46 |

Primary Examiner—Bernard A. Gilheany
Assistant Examiner—F. E. Bell
Attorney—Harry M. Saragovitz, Edward J. Kelly, Herbert Berl and Glenn S. Ovrevik

[57] ABSTRACT

Disclosed is a new and novel switching of four three phase squirrel cage motors adapted to drive the wheel of a vehicle whereby extension of the constant power-speed range of said motors is attained through means of integral switching of the windings of the motors without resorting to mechanical gear shifters at the wheel.

7 Claims, 7 Drawing Figures

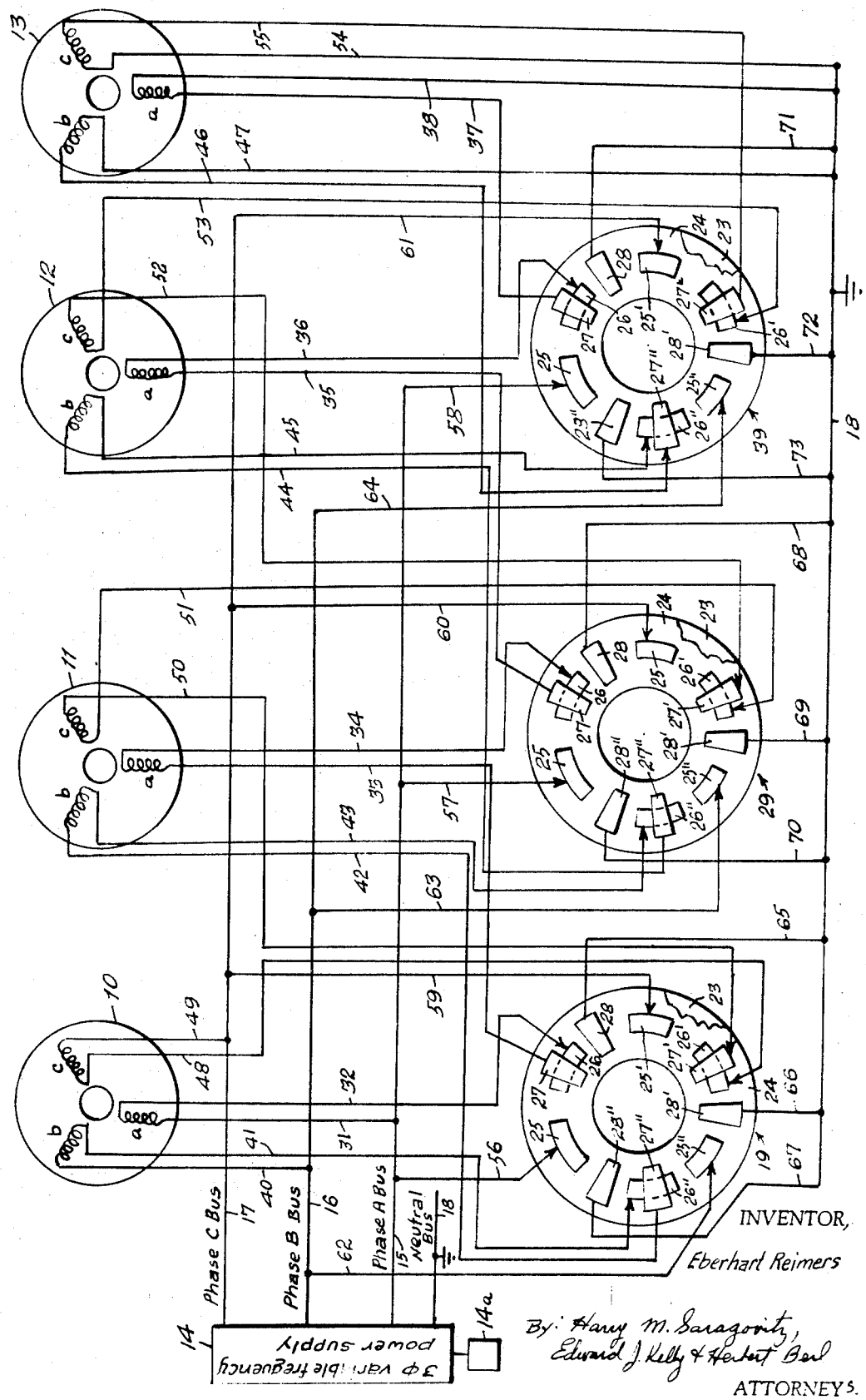

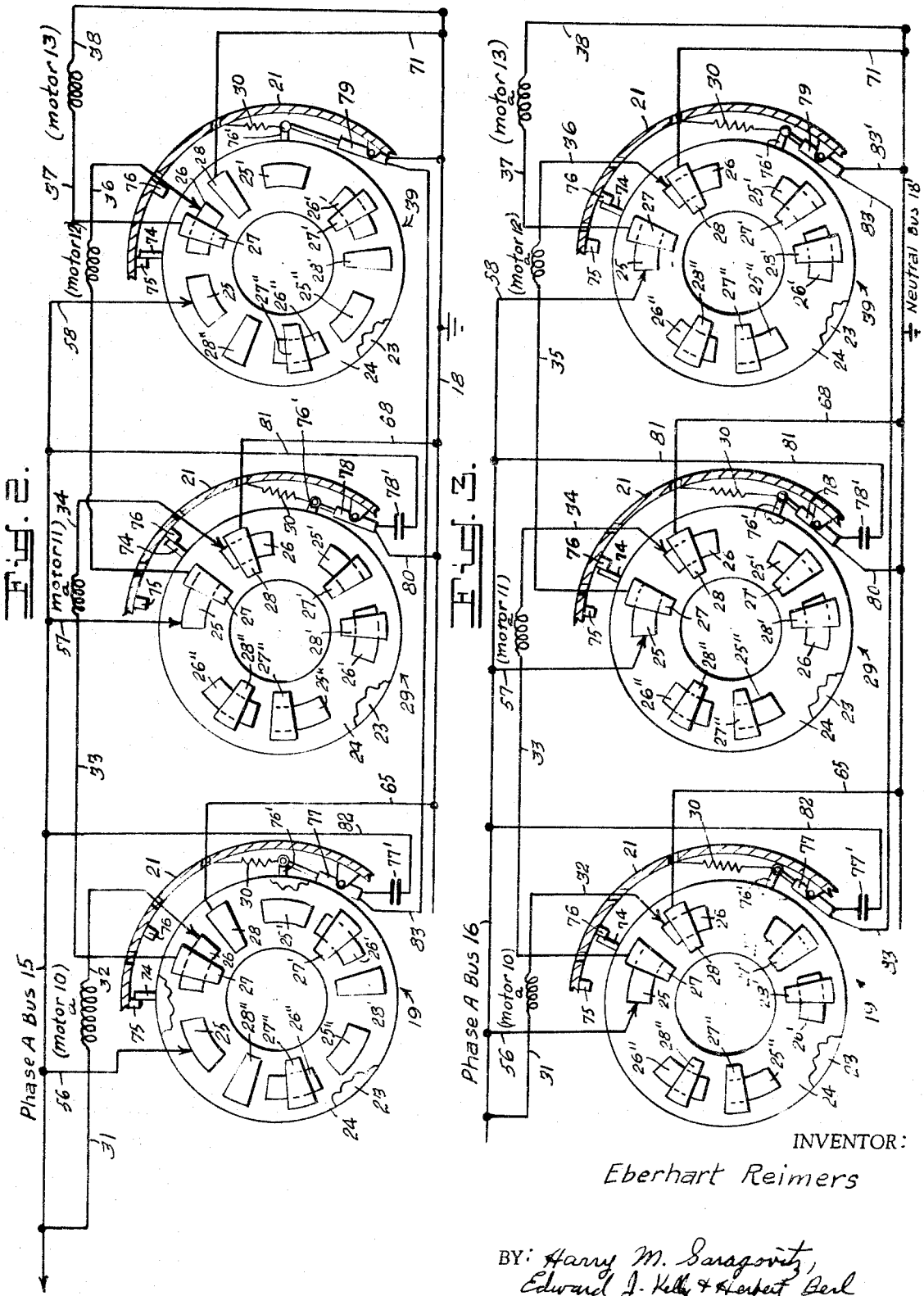

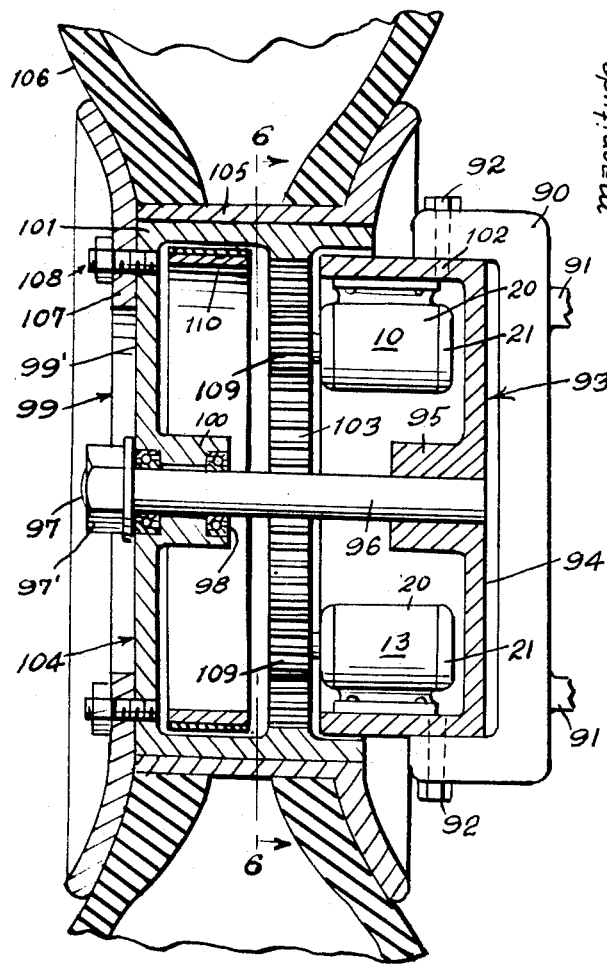
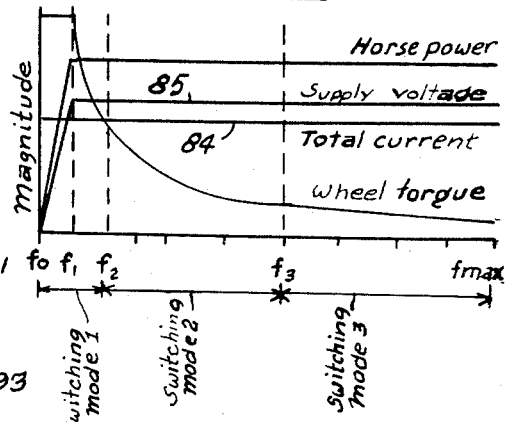
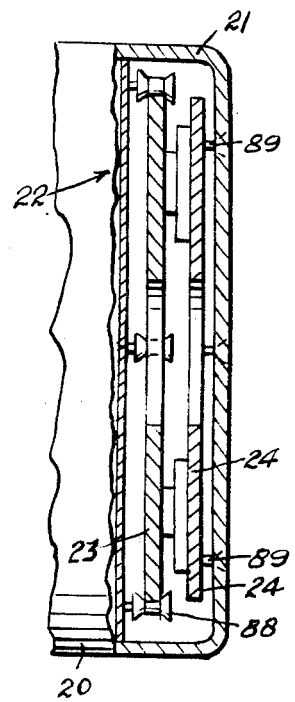
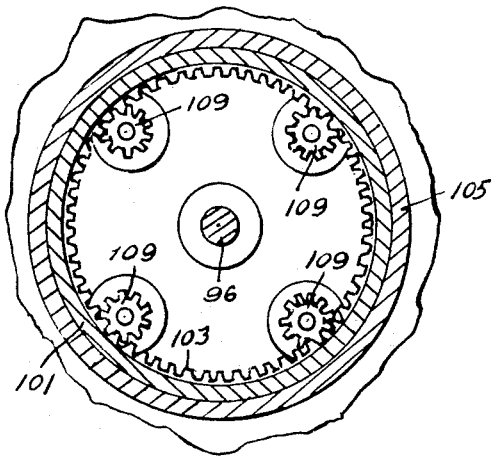

ELECTRICAL GEAR SHIFTING IN WHEEL DRIVES

The invention described herein may be manufactured, used, and licensed by or for the Government for governmental purposes without the payment to me of any royalty thereon.

In prior electrical devices for driving vehicle wheels, large single motors were employed in combination with mechanical gear shifters to obtain various speed-ranges which resulted in a constant horsepower-speed range extension but such arrangements were inefficient because of the weight factor involving the gear box which had to be designed to withstand heavy torque fluctuations. Also when changing gears the vehicle is subjected to objectionable jerking. A single three phase motor, four windings per phase, has been prepared as a driving means for wheels of a vehicle. In this proposal relays are employed to function slide switches whereby the four windings of each phase of a three phase motor are switched from series to parallel connection to attain constant horsepower-speed range extension. However, this necessitates the utilization of 21 cables plus the neutral cable carrying fully rated current and extending externally from the motor to the power source in the vehicle. However, in the instant invention only three cables plus the neutral at full rated current are required between the wheel and power source. The four smaller motors employed in the instant invention have a weight comparable to and a horsepower rating equivalent to that of the aforementioned single motor. However, this is more than offset by the additional cable weight and contactors, and other complexities relative to the power source due to the make and break of the power source when the single motor is employed to drive the wheel.

The novel features that are considered characteristic of the invention are set forth with particularity in the appended claims, the invention itself, however, both as to its organization and method of operation as well as additional objects and advantages thereof will best be understood from the following description when read in conjunction with the accompanying drawings in the several figures of which like identify like elements and in which:

FIG. 1 is a schematic diagram of the invention;

FIG. 2 is a simplified schematic diagram of the invention illustrating a second switching mode;

FIG. 3 is a diagram similar to that of FIG. 2 illustrating a third switching mode;

FIG. 4 graphically illustrates the extended horsepower range by means of switching motor windings.

FIG. 5 is a fragmentary view, partly in cross section, disclosing the switching means as housed in certain of the motors;

FIG. 6 is a cross sectional view through the wheel of the vehicle employing the invention; and FIG. 7 is a cross sectional view taken along line 6—6 of FIG. 5.

An object of the invention is circuitry and means for selective switching of squirrel cage motors adapted to drive a wheel or wheels of a vehicle whereby constant horsepower is maintained throughout all speed ranges of the vehicle without a break in the flow of current to the motors.

Another object of the invention is means for controlling the switching of motors adapted to drive the wheel or wheels of a vehicle from series to parallel connection across the power source whereby the power flow is not interrupted and maintained constant.

Another object of the invention is the extension of the constant power-speed range of motors adapted to drive a wheel or wheels of a vehicle through means of integral switching of the windings of the motors without resorting to mechanical gear shifting.

Another object of the invention is means responsive to controlled change in frequency of a three phase solid state power supply supplying power to squirrel cage motors adapted to drive the wheel or wheels of a vehicle whereby respective windings of said motors are automatically switched from series to series parallel to parallel connection or vice versa without interruption of power flow to said motors.

Another object of the invention is means for switching squirrel cage motors adapted to drive the wheel or wheels of a vehicle from series to series parallel to parallel connection and vice versa whereby the value of the voltage applied to said motors and the value of the resultant current are each held constant thereby maintaining a constant horsepower throughout the entire speed range of the vehicle.

A preferred embodiment of the invention, except for some specifics, is disclosed in the schematic diagram of FIG. 1 wherein four identical three phase squirrel cage motors 10, 11, 12 and 13 respectively, powered by a solid state three phase variable frequency converter comprising power supply 14 which has its input coupled to the vehicle D.C. supply 14a, are employed to drive a wheel of a utility vehicle, FIGS. 6 and 7. Each of these motors is provided with three windings in a well known manner which are identified by reference characters $a$, $b$ and $c$ corresponding to related phases A, B and C of the variable frequency solid state power supply 14, the corresponding buses of which are identified by reference characters 15, 16, and 17, respectively, with the neutral bus being indicated by 18.

The three phase squirrel cage motors 10, 11 and 12 are each provided in an end cap thereof, FIG. 5, with an identical two position rotary switch means 19, 29 and 39, respectively. The three rotary switch means comprise a three speed winding-shifter means initially positioned in regard to a selected frequency of the three phase variable frequency power supply 14, low speed orientation, to connect windings $a$ in series, windings $b$ in series and windings $c$ in series of the four motors between neutral bus 18 and buses 15, 16 and 17, respectively, whereby the four motors 19–13 are connected in series with the power supply 14.

Upon increasing the frequency of power supply 14, intermediate speed operation, the winding-shifting responds thereto to connect windings $a$ in series, windings $b$ in series and windings $c$ in series, of motors 10 and 11 between the neutral bus 18 and buses 15, 16 and 17, respectively, of the power supply 14 and also to connect windings $a$ in series windings $b$ in series and windings $c$ in series of the motors 12 and 13 between the neutral bus 18 and buses 15, 16 and 17, respectively. Thus, it can be seen that the motors are connected in two parallel groups across the three phase variable frequency power supply 14, each group containing two series connected motors. Upon further increase in frequency of the power supply, full or running speed operation, the winding-shifter responds to connect windings a in parallel, windings b in parallel and windings c in parallel of motors 10–13 between the neutral bus 18 and buses A, B and C, respectively, where the four motors are connected in parallel across power supply 14.

The two-position switching means provided in an end cap 21, FIGS. 1 and 5, of each motor 10–12 consists of a disk member 23 adapted to rotate in cap 21 and a disk member 24 axially aligned with disk member 23 and affixed to the end closure 22 of the motor shell. Referring to FIG. 1, each disk is divided into three sectors, each sector containing the same number and arrangement of cooperating contacts. In a first sector spaced contacts 25 and 26 on rotatable disk 23 are arranged for cooperation with spaced contacts 27 and 28 on a fixed disk 24. Similarly in the second sector, spaced contacts 25' and 26' on rotatable disk 23 are arranged for cooperation with spaced contacts 27' and 28' on fixed disk 24, and in the third sector spaced contact 25'' and 26'' on rotatable disk 23 are arranged for cooperation with spaced contacts 27'' and 28'' on fixed disk 24.

The schematic diagram of FIG. 1 illustrates the position of the switch means 19, 29 and 39 for series connection or low speed position of the motors 10–13. These switch means are each held releasably in this position by means of a spring 30 as shown in FIG. 2. Winding a of motor 10 has one terminal connected to the phase A bus 15 by means of conductor 31 on another terminal by means of conductor 32 to contact 26 in engagement with contact 27 both of switch means 19; winding a of motor 11 has one terminal connected by conductor 33 to contact 26 in engagement with contact 27 both of switch means 19 and another terminal connected by means of conductor 34 to contact 26 in engagement with contact 27 both of switch means 29. Winding a of motor 12 has one terminal connected by conductor 35 to contact 27 of switch means 29 and another terminal connect by means of conductor 36 to contact 26 in engagement with contact 27 both of switch means 39; and winding a of motor 13 has one terminal connected by means of conductor 37 to contact 27 in engagement with contact 26 both of switch means 39 and another terminal connected by means of conductor 38 to the neutral bus 18. Thus it can be seen that all windings a are connected in series between the phase A bus 15 and neutral bus 18.

Winding b of motor 10 has one terminal connected to the phase B bus 16 by means of conductor 40 and another terminal by means of conductor 41 to contact 26'' in engagement with contact 27'' both of switch means 19; winding b of motor 11 has one terminal connected by means of conductor 42 to contact 27'' in engagement with contact 26'' both of switch means 19 and another terminal by means of conductor 43 to contact 26'' in engagement with contact 27'' both of switch means 29; winding b of motor 12 has one terminal connected by means of conductor 44 to contact 27'' in engagement with contact 26'' both of switch means 29 and another terminal connected by means of conductor 45 to contact 26'' in engagement with contact 27'' both of switch means 39; and winding b of motor 13 has one terminal connected by means of conductor 46 to contact 27'' in engagement with contact 26'' both of switch means 39 and another terminal connected by means of conductor 47 to the neutral bus 18. Thus it can be seen that all windings b are connected in series between the phase B bus 16 and neutral bus 18.

Winding c of motor 10 has one terminal connected to the phase C bus 17 by means of conductor 49 and another terminal by means of conductor 48 to contact 26' in engagement with contact 27' both of switch means 19; winding c of motor 11 has one terminal connected by means of conductor 50 to contact 27' in engagement with contact 26' both of switch means 19 and another terminal connected by means of conductor 51 to contact 26' in engagement with contact 27' both of switch means 29; winding c of motor 12 has one terminal connected by means of conductor 52 to contact 27' in engagement with contact 26' both of switch means 29 and another terminal connected by means of conductor 53 to contact 26' in engagement with contact 27' both of switch means 39; and winding c of motor 13 has one terminal connected by means of conductor 55 to contact 27' in engagement with contact 26' both of switch means 39 and another terminal connected by means of conductor 54 to the neutral bus 18. Thus it can be seen that all winding c are connected in series between the phase C bus 17 and neutral bus 18.

Contact 25 of switch means 19, contact 25 of switch means 29 and contact 25 of switch means 39 are connected to the phase A bus line 15 by means of conductors 56, 57 and 58, respectively. Contact 25' of switch means 19, contact 25' of switch means 29 and contact 25' of switch means 39 are connected to the phase C bus line 17 by means of conductors 59, 60 and 61, respectively. Contact 25'' of switch means 19, contact 25'' of switch means 29 and contact 25'' of switch means 39 are connected to the phase B bus line 16 by means of conductors 62, 63 and 64, respectively. Contacts 28, 28' and 28'' of switch means 19 are connected to neutral bus 18 by conductor means 65, 66 and 67, respectively; contacts 28, 28' and 28'' of switch means 29 are connected to neutral bus 18 by conductor means 68, 69 and 70, respectively; and contacts 28, 28' and 28'' of switch means 39 are connected to neutral bus 18 by conductor means 71, 72 and 73, respectively. In response to an increase in frequency, intermediate speed for the vehicle, of the power supply 14, disk 23 of switch means 29 is rotated to a second position whereby its contacts 25–25'' engage contacts 27–27'' of disk 24 and its contacts 26–26'' engage contacts 28–28'' of disk 24 to connect the four motors into two parallel groups, motors 10–11 and motors 12–13, each group containing two series connected motors as illustrated in the simplified schematic of FIG. 2. In response to a further increase in frequency of power supply 14 by the operator, running speed of the vehicle, disks 23 of switch means 19 and 39 are rotated to a second position, disk 23 of switch means 29 being maintained in the second position, whereby their respective contacts 25–25'' engage respective contacts 27–27'' of disks 27 and their respective contacts 26–26'' engage respective contacts 28–28'' of disks 24 of switch means 19 and 39 whereby the four motors are connected in parallel across the power supply 14 as illustrated in the simplified schematic of FIG. 3.

In FIG. 2 there is shown a simplified schematic for the purpose of illustrating the switching mode employed for intermediate speeds of the vehicle and some details relevant to the mechanical and electrical means employed in winding-shift means comprising switch means 19, 29 and 39. Each disk 23 is provided with a radially extended finger 74 for engagement with spaced stops 75 and 76 formed in the end cap 21 of the related motor and directed inwardly of the cavity thereof whereby rotation of each disk 23 is limited to accomplish the desired contact switching of the related disks. Each disk 23 is also provided with a second radially extended finger 76' with spring 30 connected between it and cap 21 whereby finger 74 is urged into releasable engagement with stop 75 whereby the disks 23 are releasably held in a first position, that is to say, in a first position the motors are now coupled in series with the power supply 14 as described in conjunction with FIG. 1. Each housing 21 has pivotally mounted therein a solenoid with its plunger coupled to finger 76' of disk 23 in such a manner as to overcome the force of spring 30 and rotate the disk 23 a distance limited by the engagement of finger 74 with stop 76 constituting a second position of the switch means 19, 29 and 39 housed in the end housing 21 of motors 11, 12, and 13, respectively. Thus it can be seen that solenoid 77 is operable to rotate disk 23 of switch means 19; solenoid 78 is operable to rotate disk 23 of switch means 29 and solenoid 79 is operable to rotate disk 23 of switch means 39. In order to maintain a constant power-speed range of the motors it is necessary that the action of the solenoids be related and responsive to the frequency changes of power supply 14 in regard to the intermediate and running speeds of the vehicle. This is accomplished, for example, in regard to the intermediate speed of the vehicle by connected solenoid 78 in series with a capacitor 78' forming a resonant circuit coupled by means of conductors 80 and 81, respectively, between the phase A bus 15 and neutral bus 18 and responsive to the frequency of power supply 14 utilized during the intermediate speed period of the vehicle whereby solenoid 78 is excited and rotates disc 23 of switch means 29 to the second position, that is, finger 74 thereof engages stop 76 of end cap 21 of motor 11, preventing further rotation of this disk 23. During this switching action solenoids 77 and 79 are not activated since the series resonant circuit of which they are a part is not resonant at the frequency of power supply 14 employed during intermediate speed operation of the vehicle. Also during this switching action the switching means 29 contacts 26 and 25 move and engage contacts 27 and 28, respectively, providing switching action for the windings a of the four motors whereby the windings a of motors 10 and 11 are connected in series between the phase A bus 15 and neutral bus 18 and the windings a of motors 12 and 13 are connected in series between the phase A bus 15 and neutral bus 18. Simultaneously the switch means 29 contacts 26' and 25' engage contacts 28' and 27', respectively, and contacts 26" and 25" engage contacts 28" and 27", respectively, providing switching action for the windings b and c, respectively, of the four motors whereby the windings b of motors 10 and 11 are connected in series between the phase B bus 16 and neutral bus 18 and the windings b of motors 12 and 13 are connected in series between the phase B bus 16 and neutral bus 18; and the windings c of motors 12 and 13 are connected in series between the phase C bus 17 and neutral bus 18. Thus it can be seen that the motors are connected into two parallel groups across power supply 14, each containing two series connected motors. In this mode of operation, intermediate speed, and with particular reference to FIG. 2, winding a has one terminal coupled to phase A bus 15 by means of conductor 31 and another terminal by means of conductor 32 to contact 26 which is in engagement contact 27 both of switch means 19. Winding of motor 11 has one terminal connected by means of conductor 33 and contact 26 of switch means 19 and another terminal connected by conductor means 34 to contact 26 of switch means 29 which is in engagement with its related contact 28 connected to the neutral bus 18 by means of conductor 68. Winding a of motor 12 has one terminal coupled through engaged contacts 27 and 25 of switch means 29 by means of conductors 35 and 57 to phase A bus 15 and another terminal connected by means of conductor 36 to contact 26 which is in contact with contact 27, both of switch means 39. Winding a of motor 13 has one terminal connected by means of conductor 37 to contact 27 which in this mode remains in contact with contact 26, switch 39, and another terminal connected by means of conductor 38 to the neutral bus 18. It is obvious from the foregoing that when switch means 29 is rotated to the second position and switch means 19 and 39 are held in the initial on first position that the windings a of motors 10 and 11 are coupled in series between the A phase bus 15 and neutral bus 18 and a windings of motors 12 and 13 are also coupled in series between the phase A bus 15 and neutral bus 18. Further, it is obvious considering the schematic of FIG. 2 and the above description in regard to the a windings switching that at the same time the b windings of motors 10 and 11 are connected in series and the b windings of motors 12 and 13 are connected in series; and the c windings of motors 10 and 11 are connected in series and the c windings of motors 12 and 13 are connected in series between the phase B bus 16 and phase C bus 17, respectively, and neutral bus 18 through switch means 29 contacts 25' and 26' in engagement with contacts 27' and 28', and contacts 25" and 26" in engagement with contacts 27" and 28", respectively. Thus motors 10 and 11 are connected in series across power supply 14 and motors 12 and 13 are connected across power supply 14. During this switching action of switch means 29 a transient condition exists which causes a temporary short circuiting of motors 12 and 13. When disk 23 of switch means 29 is rotated, contacts 26, 26' and 26" thereof momentarily bridge their respective contacts 27-28, 27'-28' and 27"-28" whereby the a, b and c windings of motors 12 and 13 are temporarily shorted across the neutral bus 18. However, motors 10 and 11 in series across the power supply 14 continue to operate carrying the full torque and power temporarily. This provides for continuous power flow in a minimum of two motors resulting in minimum speed jerks during the switching mode. The short circuit transient amplitude which is circulating through the contacts is equal to the last known stator supply current amplitude with a typical discharge time constant of 50 milliseconds. Hence, contactor life expectancy is not seriously impaired. The momentarily short circuited motors 12 and 13 generate a slight drag on the drive system, FIG. 2, until their stored flux are dissipated.

FIG. 3 is a simplified schematic illustrating the switching position of switch means 19, 29 and 39 when the third mode of operation, running speed for the vehicles, is utilized and whereby motors 10–13 are coupled in parallel across power supply 14. In this mode switch means 29 remains in its second position as described in conjunction with the second mode of operation and switch means 19 and 39 are each moved into a second position through means of solenoids 77 and 79 in a series resonant circuit. The series connected solenoids 77 and 79 are connected in series with capacitor 77' comprising the aforementioned resonant circuit coupled between the phase A bus 15 and neutral bus 18 by means of conductors 82, 83 and 83' responsive to the frequency of power supply 14 during the third mode of operation. Solenoids 77 and 79 thus energized cause disk 23 of switch means 19 and disk 23 of switch means 39 to rotate to the limit determined by their respective stops 76 whereby with reference to each said disk of switch means 19 and 39 in regard to windings a, contact 28 engages contact 26 and contact 29 engages contact 27, the related contacts of switch means 29 being in the second position, whereby the a windings of the motors are connected in parallel between the phase A bus 15 and neutral bus 18. Also in the third mode of operation with the switch means 19, 29 and 39 being in the second position, the elements of the set of contacts relative to windings b and the elements of the set of contacts relative to windings c of each said switch means as afore described are identical to elements of the set of contacts relative to the windings a and as aforedescribed are identified by means of the reference numerals applied to like elements of the set relative to windings a but bear relative a prime and double prime relative to windings b and c, respectively, and are engaged in the same positions as the contacts relative to windings a whereby the windings b are switched in parallel between the phase B bus 16 and neutral bus 18 and the windings c are switched in parallel between the phase C bus 17 and neutral bus 18. Referring more specifically to FIG. 3 and considering the positions of the contacts of switch means 19, 29 and 39 as described above in regard to the third mode of operation. The following specifically sets forth the circuitry in regard to the a windings of the motors. Winding a of motor 10 has one terminal connected to the phase A bus 15 and another terminal through engaged contacts 28 and 26 of switching means 19 to the neutral bus 18 by means of conductors 31, 32 and 65; winding a of motor 11 has one terminal connected through engaged contacts 25 and 27 of switching means 19 to the phase A bus 56 by means of conductors 33 and 56 and another terminal connected to neutral bus 18 through engaged contacts 28 and 26 of switching means 29 by means of conductors 34 and 68; winding a of motor 12 has one terminal connected through engaged contacts 25 and 27 of switch means 29 to phase A bus 15 by means of conductors 35 and 57 and another terminal connected to the neutral bus 18 through engaged contacts 28 and 26 of switching means 39 by means of conductors 36 and 71; and winding a of motor 13 has one terminal connected to phase A bus 15 through engaged contacts 25 and 27 of switch means 39 by means of conductors 37 and 58 and another terminal connected to neutral bus 18 by means of conductor 38. Thus, it can be seen that when the switching means 19, 29 and 39 are in the second position, the windings a of the motors are connected in parallel between the phase A bus 15 and neutral bus 18. Further, it can be seen considering the schematic of FIG. 1 in view the second position of switching means 19, 29 and 39 illustrated in FIG. 3 and the circuitry thereof as described above with reference to the windings a, it is apparent that simultaneously with the above described switching of the a windings the b windings are switched in parallel between the phase B bus 16 and neutral bus 18 and the c windings are switched in parallel between the phase C bus 19 and neutral bus 18 through the action of the associated switching contacts 25'–28' and 25''–28'', respectively. Thus motors 10–13 are connected in parallel across the power supply 14. During the third switching mode action contacts 26, 26' and 26'' of switching means 19 momentarily bridge pairs of contacts 27–28, 27'–28' and 27''–28'' thereof, respectively, and contacts 26, 26' and 26'' of switch means 39 momentarily bridge pairs of contacts 27–28, 27'–28' and 27''–28'' thereof, respectively, whereby the a, b and c windings of motors 11 and 13, respectively are shorted across the neutral bus 18. However, this does not present a serious condition since this transient period causes but a momentary shorting of motor 11 and 13, the motors 10 and 12 during this period continuing to operate in parallel across power supply 14 carrying full torque and power temporarily.

FIG. 4 is a graph illustration of the extended constant horsepower range obtained by means of integral switching of the motors windings without resorting to mechanical gear shifters at the driven wheel or wheels. It can be seen from examination of the graph that once the power is applied to the motors, the current 84 and voltage 85 hold constantly over the three operating ranges indicated by mode 1, mode 2 and mode 3. The extended constant horsepower range is realized during the first and second modes $f_1$, $f_2$ and $f_3$ indicate the initial frequency, increase in frequency and further increase in frequency of power supply 14 as aforedescribed in conjunction with the operation of the winding shifter. Curves 86 and 87 indicate the relationship of the current to the voltage, respectively, during the first and second modes when mechanical gear shifting means are employed at the driven wheel or wheels of the vehicle.

Mounted in an end cap of each motor 10, 11 and 12 is a related switch means, namely, 19, 29 and 39, respectively as shown with particularity in FIG. 5 wherein since all motors are identical in structure reference numbers 20 and 21 identify motor shall and cap, respectively, as structure pertinent to all the motors. The shell 20 is provided with a back plate or closure 22 in which is mounted in a well known manner grooved rollers 88 rotatably supporting disk 22 with the contacts thereof facing rearwardly of the plate. Cap 21 is secured to shell 20 in any appropriate manner and has affixed therein by means of rivets 89 disk 24 in alignment with disk 24 and in contact relationship therewith.

FIGS. 6 and 7 disclose one practical application of the invention wherein the four motors 10–13 in combination with winding shift means are arranged in a housing to drive a front wheel of a vehicle. Although but one driven wheel is shown, it is to be understood that two or more wheels of a vehicle may be driven in the same manner. A yoke 90 affixed to a vehicle frame 91 pivotally supports by means of king pins 92 a cylindrical housing 93 which is formed with a closed end 94. A hub 95 in which is supported one end of a spindle 96 is formed on the interior surface of closed end 94 centrally thereof. A rotatable cylindrical housing 99 by means of bearings 98 affixed in a central perforation or hub 100 thereof is mounted on spindle 96 adjacents its end 97 and retained thereon by means of nut 97'. The cylindrical wall 101 of housing 99 which in part surrounds cylindrical wall 102 of housing 93 is formed with an internal ring gear 103. A demountable rim 104 having a cylindrical wall 105 which neatly engages the cylindrical wall 101 of housing 99 supports a tire 106 and is formed with a centrally perforated closed end 107 affixed to the closed end 99' of rotatable housing 99 by means of studs and nuts as indicated by reference numeral 108. The motors 10–13 are mounted in a well known manner equidistantly apart on the inside surfaces of cylindrical wall 102 and cylindrical housing 93. Each motor has a rotor-shaft extending exteriorly thereof which is provided with a pinion 109 in engagement with the internal ring gear 103 whereby when the motors are energized the vehicle wheel is driven. A brake shoe 110 may be positioned within rotating housing 99 whereby braking action may be applied. Details of brake shoe 110 and related brake system are not shown since these may be accomplished in a manner well known in the art.

I claim:

1. An electrical gear shifting means in circuit arrangement with squirrel cage induction motors adapted to drive a wheel of a vehicle whereby an extension of the constant power-speed range of the motors with accompanying constant current amplitude are attained through integral switching of the windings of the motors by said means without resorting to mechanical gear shifting at the wheel and wherein the power flow is not interrupted during the integral switching, comprising in combinations:
   first, second, third and fourth squirrel cage three phase induction motors affixed in a wheel housing of said vehicle and adapted through direct gear means to rotate said wheel;
   single first, second and third spaced stator windings positioned in the housing of each said motor;
   a three phase variable frequency power supply coupled through the electrical gear shifting means to the windings of said motors;
   said electrical gear shifting means adapted to connect by switching action thereof related windings of said motors in series, series-parallel and parallel with said power supply; and
   means responsive to selected changes in frequency of said power supply coupled to the electrical gear shifting means whereby the switching action of the electrical gear shifting means is attained.

2. The invention in accordance with claim 1 wherein said electrical gear shifting means comprises a first rotatable switching means in a bell of said first motor, a second rotatable switching means in bell of said second motor, and a third rotatable switching means in a bell of said third motor, and resilient means in each said bell releasably retaining the switching means in each said bell in a first position whereby said first, second and third switching means connect related stator windings of said motors in series between the neutral and respective buses of said power supply through interconnecting circuit means.

3. The invention in accordance with claim 2 wherein said means responsive to selected changes in frequency of said power supply comprises a first resonant circuit means responsive to selected change in frequency of said power supply and adapted to rotate said second rotatable switching means in response to said frequency changed to a second position whereby through interconnecting circuit means between said first rotatable switching means and said second rotatable switching means related stator windings of the first and second motors are connected in series between the neutral and respective buses of said power supply and whereby through interconnecting circuit means between said second rotatable switching means and said third rotatable switching means related stator windings of said third and fourth motors are connected in series between the neutral and related buses of said power supply.

4. The invention in accordance with claim 3 wherein said means responsive to selected changes in frequency of said power supply comprises a second resonant circuit means responsive to a selected further change in frequency of said power supply and adapted to rotate said first and third rotatable switching means to a second position in response to said frequency change while said second switching means remains in said second position whereby through interconnecting circuit means between said first, second and third rotatable switching means related stator windings of said motors are connected in parallel between the neutral and respective buses of said power supply.

5. The invention in accordance with claim 3 wherein said first resonant circuit means comprises:
   a plunger type solenoid affixed in the bell of said second motor and coupled to the second rotatable switching means for rotation thereof, and
   a compacitor connected in series with said solenoid forming therewith a series resonant circuit connected to said power supply and responsive said selected change in frequency.

6. The invention in accordance with claim 1 wherein said first, second, third and fourth squirrel cage three phase induction motors affixed in a wheel housing of said vehicle and adapted through direct gear means to rotate said wheel comprise in combination:
   a stationary cup-shaped housing having the closed end whereof affixed to the frame of said vehicle and centrally supporting a spindle therein extending outwardly beyond the open end of the cup-shaped housing;
   said first, second, third and fourth induction motors each provided with a pinion on the shaft extending exteriorly thereof and affixed to the inner surface of the cylindrical member of the stationary cup-shaped housing in equidistant relationship to each other about said spindle with the pinion of each said motor positioned exteriorly of the mouth of said stationary cup-shaped housing;

a rotatable cup-shaped housing supporting a tire and having the closed end thereof rotatably mounted through bearings in the center of the closed end thereto in such a manner that its cylindrical member is in telescopic relationship with the cylindrical member of said stationary cup-shaped housing; and an internal ring formed on the interior surfaces of the cylindrical member of the rotatable cup-shaped housing and positioned therein whereby it engages said pinions;

said motors when activated by the power supply through the electric gear shifting means drive the rotatable housing through the pinions and internal ring gear to cause the rotatable housing to rotate on the spindle.

7. The invention in accordance with claim 4 wherein said second resonant circuit means comprises:

a first plunger type solenoid affixed in the bell of said first motor and coupled to the first rotatable switching means for rotation thereof, a second plunger type solenoid affixed in the bell of said third motor and coupled to the third rotatable switching means for rotation thereof and electrically connected in series with said first solenoid, and a capacitor connected in series with the said series connected solenoids forming therewith a series resonant circuit connected to said power supply and responsive to said further change in frequency.

* * * * *